US011872580B2

(12) United States Patent
Seubert et al.

(10) Patent No.: US 11,872,580 B2
(45) Date of Patent: Jan. 16, 2024

(54) COMPOSITE ULTRASONIC MATERIAL APPLICATORS WITH EMBEDDED SHAPING GAS MICRO-APPLICATORS AND METHODS OF USE THEREOF

(71) Applicant: Ford Motor Company, Dearborn, MI (US)

(72) Inventors: Christopher Michael Seubert, New Hudson, MI (US); Mark Edward Nichols, Saline, MI (US); Kevin Richard John Ellwood, Ann Arbor, MI (US); Wanjiao Liu, Ann Arbor, MI (US); Aaron M. Fiala, Newport, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 17/862,722

(22) Filed: Jul. 12, 2022

(65) Prior Publication Data

US 2022/0347710 A1 Nov. 3, 2022

Related U.S. Application Data

(60) Division of application No. 17/020,394, filed on Sep. 14, 2020, now Pat. No. 11,413,643, which is a (Continued)

(51) Int. Cl.
*B05B 12/04* (2006.01)
*B05B 12/14* (2006.01)
(Continued)

(52) U.S. Cl.
CPC .......... *B05B 17/0638* (2013.01); *B05B 12/04* (2013.01); *B05B 12/14* (2013.01); (Continued)

(58) Field of Classification Search
None
See application file for complete search history.

(56) References Cited

U.S. PATENT DOCUMENTS 5,823,428 A * 10/1998 Humberstone ..... B05B 17/0684 239/4
6,533,379 B1 * 3/2003 Kubota ................ B41J 2/04541 347/12
(Continued)

*Primary Examiner* — Binu Thomas
(74) *Attorney, Agent, or Firm* — Burris Law, PLLC

(57) ABSTRACT

A method of controlling application of at least one material onto a substrate includes configuring a material applicator having an array plate with an applicator array. The applicator array has a plurality of micro-applicators with a first subset of micro-applicators and a second subset of micro-applicators. Each of the plurality of micro-applicators has a plurality of apertures through which fluid is ejected. The first subset of micro-applicators and the second subset of micro-applicators are individually addressable, and a liquid flows through the first subset of micro-applicators and a shaping gas, e.g., air, flows through the second subset of micro-applicators. The flow of shaping gas shapes the flow of the liquid from the first subset of micro-applicators to the substrate.

19 Claims, 7 Drawing Sheets

Related U.S. Application Data continuation-in-part of application No. 16/211,554, filed on Dec. 6, 2018, now Pat. No. 10,940,501.

(60) Provisional application No. 62/624,013, filed on Jan. 30, 2018.

(51) Int. Cl.

| | |
|---|---|
| ***B05B 12/18*** | (2018.01) |
| ***B41J 3/407*** | (2006.01) |
| ***B05B 17/00*** | (2006.01) |
| ***B05D 1/02*** | (2006.01) |
| *B05B 13/04* | (2006.01) |

(52) U.S. Cl.

CPC ................ *B05B 12/18* (2018.02); *B05D 1/02* (2013.01); *B41J 3/407* (2013.01); *B05B 13/0452* (2013.01); *B05B 17/0646* (2013.01)

(56) References Cited

U.S. PATENT DOCUMENTS

| | | | | |
|---|---|---|---|---|
| 2006/0051496 | A1* | 3/2006 | Tashiro ..................... | H01J 9/02<br>118/300 |
| 2009/0181182 | A1* | 7/2009 | Sloan ................... | C09D 133/06<br>427/508 |
| 2011/0262622 | A1* | 10/2011 | Herre ...................... | B05C 5/027<br>118/712 |
| 2015/0140235 | A1* | 5/2015 | Meier ................... | B05B 3/1092<br>118/323 |
| 2019/0337006 | A1* | 11/2019 | Fritz ..................... | B05B 15/531 |
| 2019/0381529 | A1* | 12/2019 | Schaumberger .... | B05B 13/0431 |

* cited by examiner

COMPOSITE ULTRASONIC MATERIAL APPLICATORS WITH EMBEDDED SHAPING GAS MICRO-APPLICATORS AND METHODS OF USE THEREOF

CROSS-REFERENCE TO RELATED APPLICATIONS

This application is a divisional of U.S. patent application Ser. No. 17/020,394, filed on Sep. 14, 2020, which is a continuation-in-part of U.S. patent application Ser. No. 16/211,554, filed on Dec. 6, 2018, now U.S. Pat. No. 10,940,501, which claims the benefit of U.S. patent application Ser. No. 62/624,013, filed on Jan. 30, 2018. The disclosures of the above applications are incorporated herein by reference.

FIELD

The present invention relates to the painting of vehicles, and more particularly to methods and equipment used in high volume production to paint the vehicles and components thereof.

BACKGROUND

The statements in this section merely provide background information related to the present disclosure and may not constitute prior art.

Painting automotive vehicles in a high volume production environment involves substantial capital cost, not only for application and control of the paint, but also for equipment to capture overspray. The overspray can be up to 40% of the paint that exits an applicator, or in other words, to 40% of the paint that is purchased and applied is wasted (i.e. the transfer efficiency is ~60%). Equipment that captures overspray involves significant capital expenses when a paint shop is constructed, including large air handling systems to carry overspray down through a paint booth, construction of a continuous stream of water that flows under a floor of the paint booth to capture the overspray, filtration systems, and abatement, among others. In addition, costs to operate the equipment is high because air (flowing at greater than 200K CFM) that flows through the paint booths must be conditioned, the flow of water must be maintained, compressed air must be supplied, and complex electrostatics are employed to improve transfer efficiency.

With known production equipment, paint is atomized by rotating bells, which are essentially a rotating disk or bowl that spins at about 20,000-80,000 rpms. The paint is typically ejected from an annular slot on a face of the rotating disk and is transported to the edges of the bell via centrifugal force. The paint then forms ligaments, which then break into droplets at the edge of the bell. Although this equipment works for its intended purpose, various issues arise as a result of its design. First, the momentum of the paint is mostly lateral, meaning it is moving off of the edge of the bell rather than towards the vehicle. To compensate for this movement, shaping air is applied that redirects the paint droplets towards the vehicle. In addition, electrostatics are used to steer the droplets towards the vehicle. The droplets have a fairly wide size distribution, which can cause appearance issues.

These issues of overspray, transfer efficiency, and paint uniformity, among other issues related to the painting of automotive vehicles or other objects in a high volume production environment, are addressed by the present disclosure.

SUMMARY

In one form of the present disclosure, a method of controlling application of at least one material onto a substrate includes configuring a material applicator having an array plate with an applicator array comprising a plurality of micro-applicators with a first subset of micro-applicators and a second subset of micro-applicators. Each of the plurality of micro-applicators has a plurality of apertures through which fluid is ejected, the first subset of micro-applicators and the second subset of micro-applicators are individually addressable, and a liquid flows through the first subset of micro-applicators and a shaping gas flows through the second subset of micro-applicators. In some variations, the flow of shaping gas shapes the flow of the liquid from the first subset of micro-applicators to the substrate. In at least one variation, the flow of shaping gas shapes an edge of the flow of the liquid from the first subset of micro-applicators. In another variation, the flow of shaping gas shapes a width of the flow of the liquid from the first subset of micro-applicators. And in some variations, the flow of shaping gas shapes an edge and a width of the flow of the liquid from the first subset of micro-applicators. In at least one variation the shaping gas is air.

In some variations, a plurality of materials is ejected from the first subset of micro-applicators. And in at least one variation the first subset of micro-applicators is switched on and off to vary a pattern width of the at least one material onto the substrate. In some variations, the second subset of micro-applicators is switched on and off to vary a pattern width of the at least one material onto the substrate.

In at least one variation, at least one of the flow rate and pressure of the shaping gas is altered to vary a pattern width of the at least one material onto the substrate. In some variations, the first subset of micro-applicators is positioned on a first plane and the second subset of micro-applicators is positioned on a second plane different than the first plane.

In some variations at least one of the micro-applicators in the first subset of micro-applicators alternates from flowing the liquid therethrough to flowing the shaping gas therethrough. And in at least one variation, at least one of the micro-applicators in the second subset of micro-applicators alternates from flowing the shaping gas therethrough to flowing the liquid therethrough.

In another form of the present disclosure, a method of controlling application of at least one material onto a surface of a vehicle includes configuring a material applicator having an array plate with an applicator array comprising a plurality of micro-applicators with a first subset of micro-applicators and a second subset of micro-applicators. Each of the plurality of micro-applicators has a plurality of apertures through which fluid is ejected, the first subset of micro-applicators and the second subset of micro-applicators are individually addressable, a liquid flows through the first subset of micro-applicators and a shaping gas flows through the second subset of micro-applicators. Also, the flow of shaping gas shapes at least one of the flow of the liquid from the first subset of micro-applicators to the surface, an edge of the flow of the liquid from the first subset of micro-applicators, and a width of the flow of the liquid from the first subset of micro-applicators.

In some variations, the flow of shaping gas shapes an edge and a width of a coating on the surface formed by the liquid. And in at least one variation, the shaping gas is air.

In some variations, at least one of the micro-applicators in the first subset of micro-applicators alternates from flowing the liquid therethrough to flowing the shaping gas therethrough and at least one of the micro-applicators in the second subset of micro-applicators alternates from flowing the shaping gas therethrough to flowing the liquid therethrough.

In still another form of the present disclosure, a material applicator for controlling application of at least one material on a substrate includes an array of micro-applicators comprising a first subset of micro-applicators and a second subset of micro-applicators different than the first subset of micro-applicators. Each of the micro-applicators in the array of micro-applicators comprises a micro-applicator plate, a plurality of apertures extending through the micro-applicator plate, a reservoir in fluid communication with the plurality of apertures. Also, at least one transducer is in mechanical communication with each of the micro-applicator plates in the first subset of micro-applicators, a liquid is in fluid communication with the plurality of apertures of each of the micro-applicators in the first subset of micro-applicators, and a gas is in fluid communication with the plurality of apertures of each of the micro-applicators in the second subset of micro-applicators. And in at least one variation, the first subset of micro-applicators and the second subset of micro-applicators are individually addressable. In such a variation, at least one of the micro-applicators in the first subset of micro-applicators is configured to alternate from flowing the liquid therethrough to flowing the gas therethrough. In the alternative, or in addition to, at least one of the micro-applicators in the second subset of micro-applicators is configured to alternate from flowing the gas therethrough to flowing the liquid therethrough.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
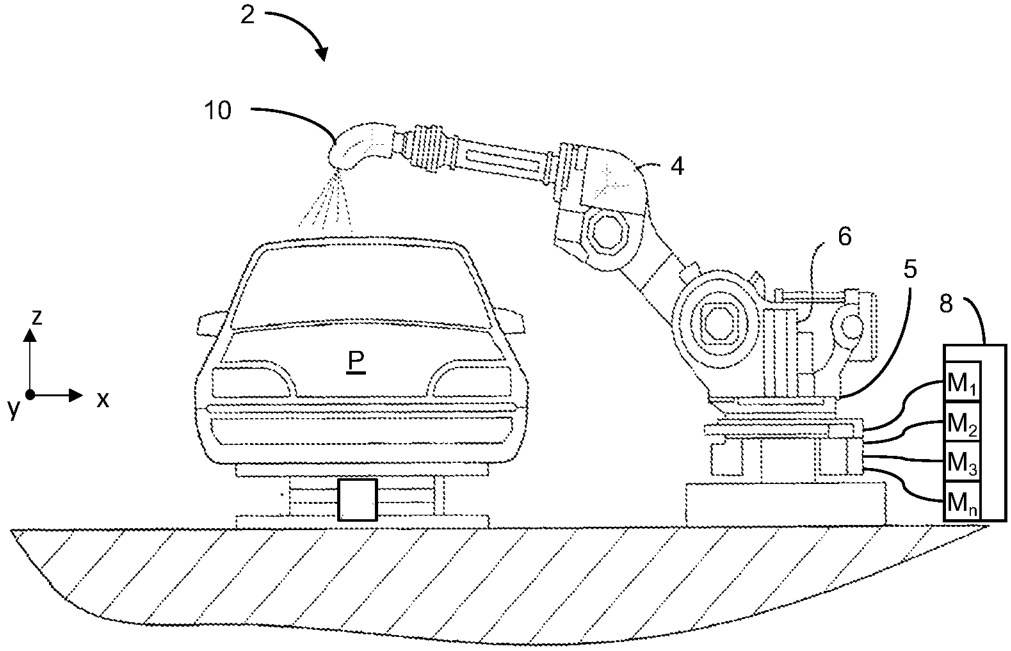
FIG. 1 shows paint spray system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of devices, methods, and systems for controlling the application of paint to automotive vehicles in a high production environment, which reduce overspray and increase transfer efficiency of the paint. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Referring now to FIG. 1, a paint spray system 2 for painting a part P using a robotic arms 4 is schematically depicted. The robotic arm 4 is coupled to at least one material applicator 10 and a rack 5. A material source 8 (e.g., a paint source) is included and includes at least one material M (materials $M_1$, $M_2$, $M_3$, . . . $M_n$ shown in FIG. 1; also referred to herein simply as "material M" or "materials Ms"). In some aspects of the present disclosure the material M includes different paint materials, different adhesive materials, different sealant materials, and the like. The arm 4 moves according to xyz coordinates with respect to rack 5 such that the material applicator 10 moves across a surface (not labeled) of the part P. Also, a power source 6 is configured to supply power to arm 4 and rack 5. Arm 4 and rack 5 are configured to supply material M from the material source 8 to the material applicator 10 such that a coating is applied to the surface of the part P. While FIG. 1 schematically depicts the paint spray system 2 having a single robotic arm 4, it should be understood that paint spray systems with more than one robotic arm 4 are included within the teachings of the present disclosure.

Figure 2A:
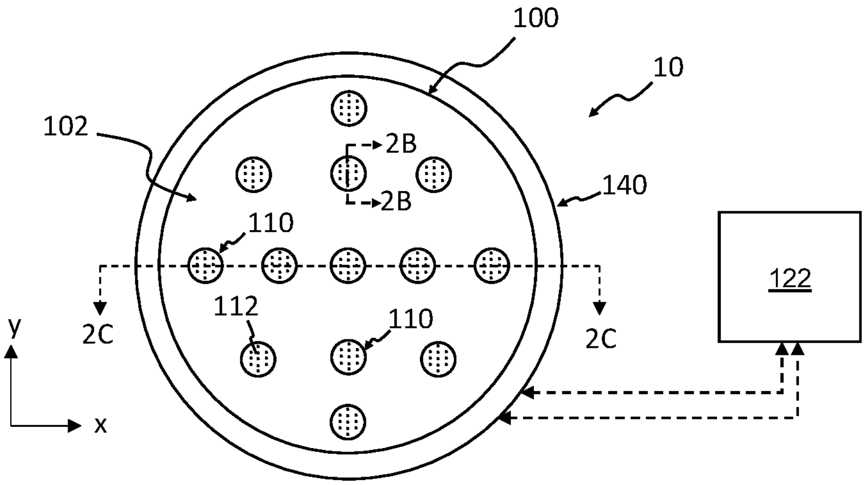
FIG. 2A shows an array of micro-applicators according to one form of the present disclosure.
Figure 2B:
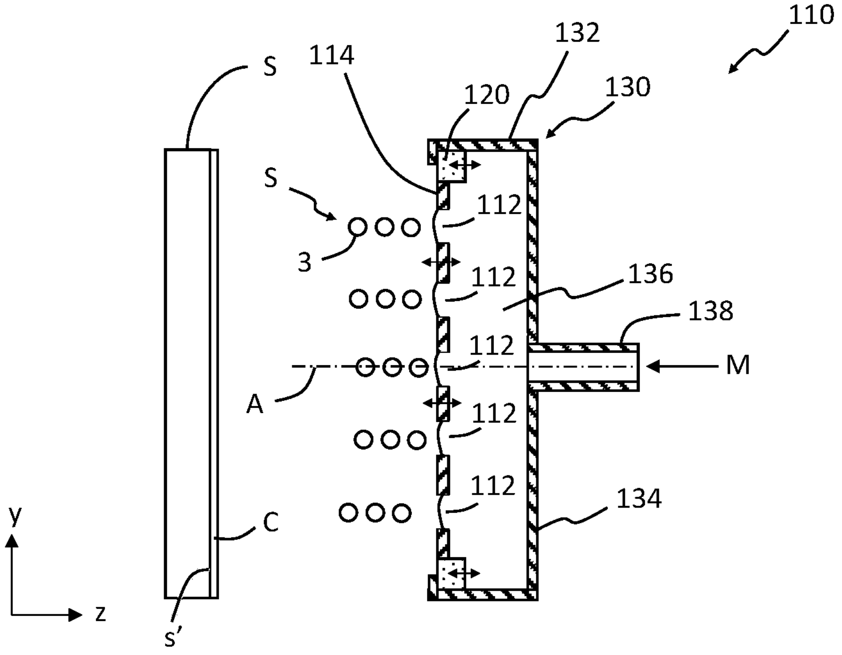
FIG. 2B shows a side cross-sectional view of section 2B-2B in FIG. 2A.
Figure 2C:
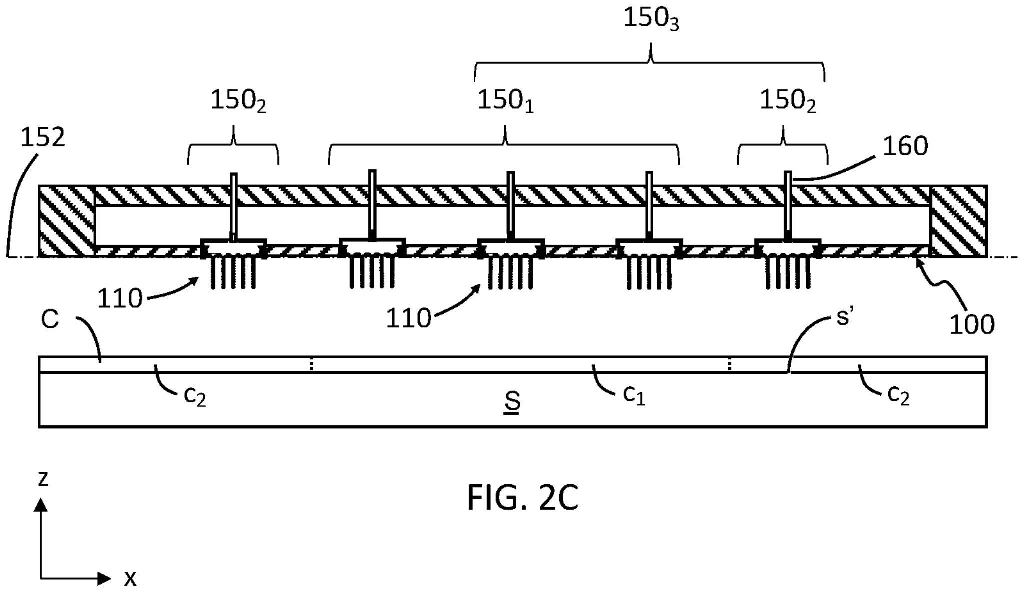
FIG. 2C shows a side cross-sectional view of section 2C-2C in FIG. 2A.

Referring now to FIGS. 2A through 2C, the material applicator 10 according to one form of the present disclosure is schematically shown. In one form of the present disclosure, the material applicator 10 includes an array plate 100 with an applicator array 102 comprising a plurality of micro-applicators 110. In some aspects of the present disclosure, the array plate 100 lies on single plane. In other aspects of the present disclosure, the array plate 100 does not lie on a single plane as discussed in greater detail below.

In some aspects of the present disclosure, the array plate 100 with the applicator array 102 is positioned within a housing 140. Each of the micro-applicators 110 comprises a plurality of apertures 112 through which a material M is ejected such that atomized droplets 3 of the material M are provided as schematically depicted in FIG. 2B. Particularly, each of the micro-applicators 110 has a micro-applicator plate 114 with the plurality of apertures 112 extending through the micro-applicator plate 114. Also, each of the micro-applicators 110 may include a transducer 120, a frame 130 and a material inlet 138. The transducer 120 is in mechanical communication with the micro-applicator plate 114 such that activation of the transducer 120 ultrasonically vibrates the micro-applicator plate 114 as schematically depicted by the horizontal (z-direction) double-headed arrows in FIG. 2B. The frame 130 includes a back wall 134 and at least one sidewall 132 such that a reservoir 136 for containing the material M is provided between the back wall 134 and the micro-applicator plate 114. The inlet 138 is in fluid communication with reservoir 136 and the material source 8 (FIG. 1) such that the material M can flow from the material source 8, through inlet 138 and into reservoir 136.

In operation, material M flows through the inlet 138 into the reservoir 136. Surface tension of material M results in material M not flowing through the apertures 112 of the micro-applicator plate 114 unless transducer 120 is activated and vibrates as schematically depicted in FIG. 2B. That is, when transducer 120 is activated and vibrates, material M is ejected through and/or from the plurality of apertures 112 as atomized droplets 3. In some aspects of the present disclosure the atomized droplets 3 have an average droplet diameter between 5 micrometers (μm) and 100 μm, for example between 10 μm and 75 μm, between 10 μm and 50 μm, or between 20 μm and 40 μm.

As schematically depicted in FIG. 2B, the atomized droplets 3 travel or propagate in a direction generally normal to the micro-applicator plate 114, i.e., generally parallel to a micro-applicator axis 'A'. As the material M is ejected through and/or from the plurality of apertures 112 a stream 'S' of atomized droplets 3 is provided by each of the plurality of apertures 112 and a coating C on the surface(s) s' of a substrate S is provided. While FIG. 2B schematically depicts the stream S of atomized droplets 3 propagating on the micro-applicator axis A, it should be understood that the atomized droplets 3 propagate diffusely from the plurality of apertures 112 and the stream S may be angled relative to the micro-applicator axis A. It should also be understood that other flow configurations of the material M flowing into and out of the reservoir 136 are included in the teachings of the present disclosure in addition to material M entering reservoir 136 through inlet 138 and exiting reservoir 136 through apertures 112.

Referring particularly to FIG. 2C, the micro-applicators 110 are positioned and aligned on a single plane 152. Also, the micro-applicators 110 are arranged in a plurality of subsets 150*n* (n=1, 2, . . . ) such that at least one subset 150*n* is individually addressable. For example, FIG. 2C schematically depicts three subsets of micro-applicators 110: subset $\mathbf{150}_1$, subset $\mathbf{150}_2$, and subset $\mathbf{150}_3$. The subset $\mathbf{150}_1$ includes the three middle micro-applicators 110 shown in FIG. 2C, the subset $\mathbf{150}_2$ includes the two outer micro-applicators 110, and the subset $\mathbf{150}_3$ includes the three micro-applicators 110 on the right hand side (+x-direction) of the array plate 100. As shown in FIG. 2C, one subset of micro-applicators (e.g., subset $\mathbf{150}_3$) can include one or more micro-applicators 110 from other subsets (e.g., subsets $\mathbf{150}_1$ and $\mathbf{150}_2$). Further, a subset of the micro-applicators may contain only one micro-applicator 110. Also, each of the micro-applicators can be a subset and thereby by individually addressable.

In some aspects of the present disclosure, a controller 122 (FIG. 2A) is included and enabled to individually address the at least one subset of micro-applicators 110 in the applicator array 102. Particularly, each of the micro-applicators 110 has a supply line 160 (FIG. 2C) in fluid communication with its reservoir 136 and the material source 8. Also, the controller 122 is configured to communicate with (i.e. address, receive, and send data) the power source 6, material source 8 and the at least one subset of micro-applicators 110 such that the at least one subset of micro-applicators 110 is individually addressable (e.g.; switched on/off) at any given time. It should be understood that since the controller 122 can individually address the at least one subset of micro-applicators 110, different materials may be sprayed on the surface s' from each applicator array 102. That is, the controller 122 can be configured to control which material M flows into the reservoir(s) of the at least one subset of micro-applicators 110 at any given time such that a coating C comprising a range of thickness, color, rheology, and the like on the surface s' of the substrate S is provided. For example, the coating C in FIG. 2C includes a middle section $c_1$ formed by the subset $\mathbf{150}_1$ of micro-applicators 110 with a different thickness, viscosity, color, curing rate, etc., than and an outer section $c_2$ formed by the subset $\mathbf{150}_2$ of the two outer micro-applicators 110. In the alternative, or in addition to, a first coating or first layer $l_1$ of the coating C may be formed from a first material $M_1$ on the substrate S using a first subset of micro-applicators (e.g., subset $\mathbf{150}_1$) and a second coating or second layer $l_2$ of the coating C may be formed from a second material $M_2$ over the first coating $l_1$ using a second subset of micro-applicators (e.g., subset $\mathbf{150}_2$). In some aspects of the present disclosure, the second coating $l_2$ is applied or formed on the first coating $l_1$ before the first coating $l_1$ is fully cured. It should be understood that the plurality of micro-applicators 110 can move across the surface S (x and/or y directions) such that the first and second coatings $l_1$, $l_2$ can be formed continuously across the surface s' of the substrate S using only a subset of micro-applicators 110. This versatility decreases the consumption of material, energy, etc., of the paint spray system 2 over other high volume production environment paint systems.

Figure 3A:
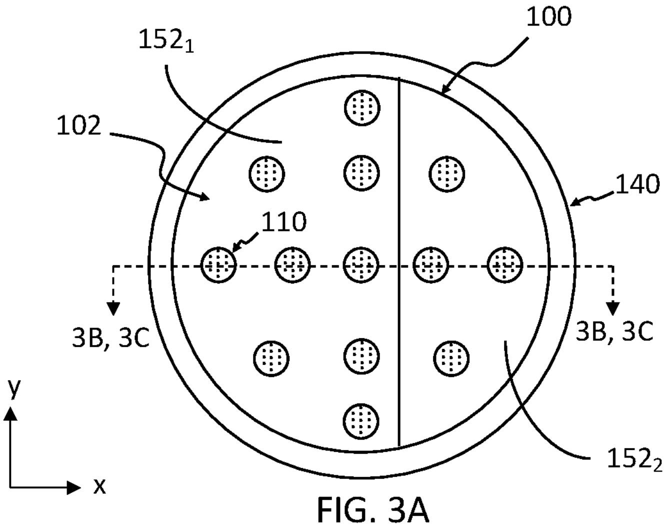
FIG. 3A shows an array of micro-applicators according to another form of the present disclosure.
Figure 3B:
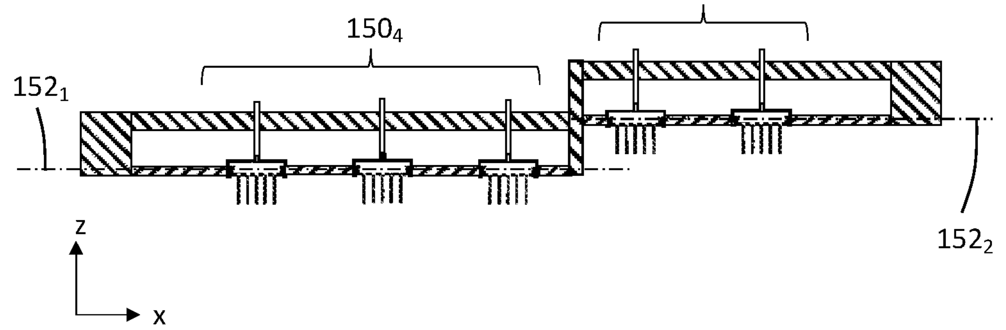
FIG. 3B shows a side cross-sectional view of section 3B-3B in FIG. 3A.
Figure 3C:
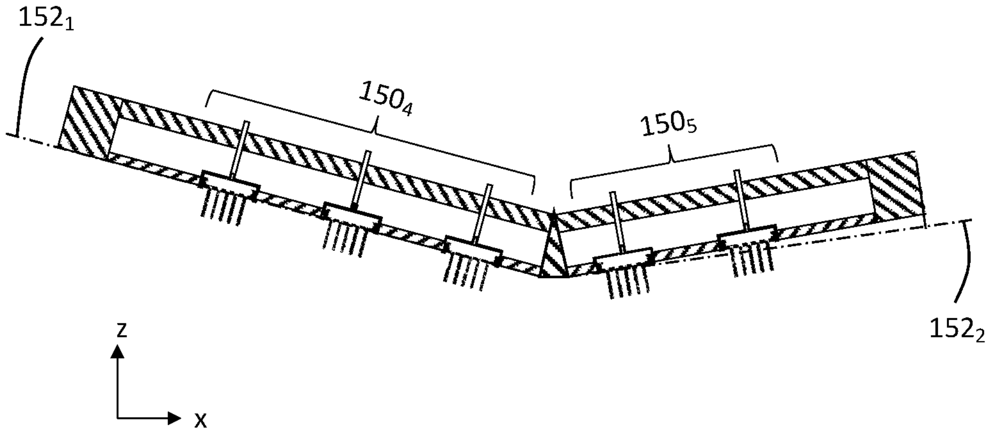
FIG. 3C shows a side cross-sectional view of section 3C-3C in FIG. 3A.

While FIGS. 2A through 2C schematically depict the micro-applicators 110 positioned on the single plane 152, FIGS. 3A through 3C schematically depict the micro-applicators positioned on different geometric planes (referred to herein simply as "plane" or "planes"). Particularly, and with reference to FIGS. 3A and 3B, the array plate 100 has two planes $152_1$ and $152_2$ arranged parallel but not coplanar to each other. One subset $150_4$ of the micro-applicators 110 is positioned and aligned on the plane $152_1$ and another subset $150_5$ of the micro-applicators 110 is positioned and aligned on the plane $152_2$. Accordingly, array plate 100 is faceted and has a stepped configuration. Also, and with reference to FIGS. 3A and 3C, the two planes $152_1$, $152_2$ of the array plate 100 are arranged non-parallel and nonplanar to each other. One subset $150_4$ of the micro-applicators 110 is positioned and aligned on the plane $152_1$ and another subset $150_5$ of the micro-applicators 110 is positioned and aligned on the plane $152_2$. Accordingly, array plate 100 is faceted and has an angled configuration with the angle not equal to zero degrees.

While planes $152_1$ and $152_2$ schematically depicted in FIG. 3C are convexly angled with respect to each other, it should be understood that planes concavely angled with respect to each other are within the teachings of the present disclosure. Also, in some forms of the present disclosure the array plate 100 is curved (concave or convex).

Figure 4:
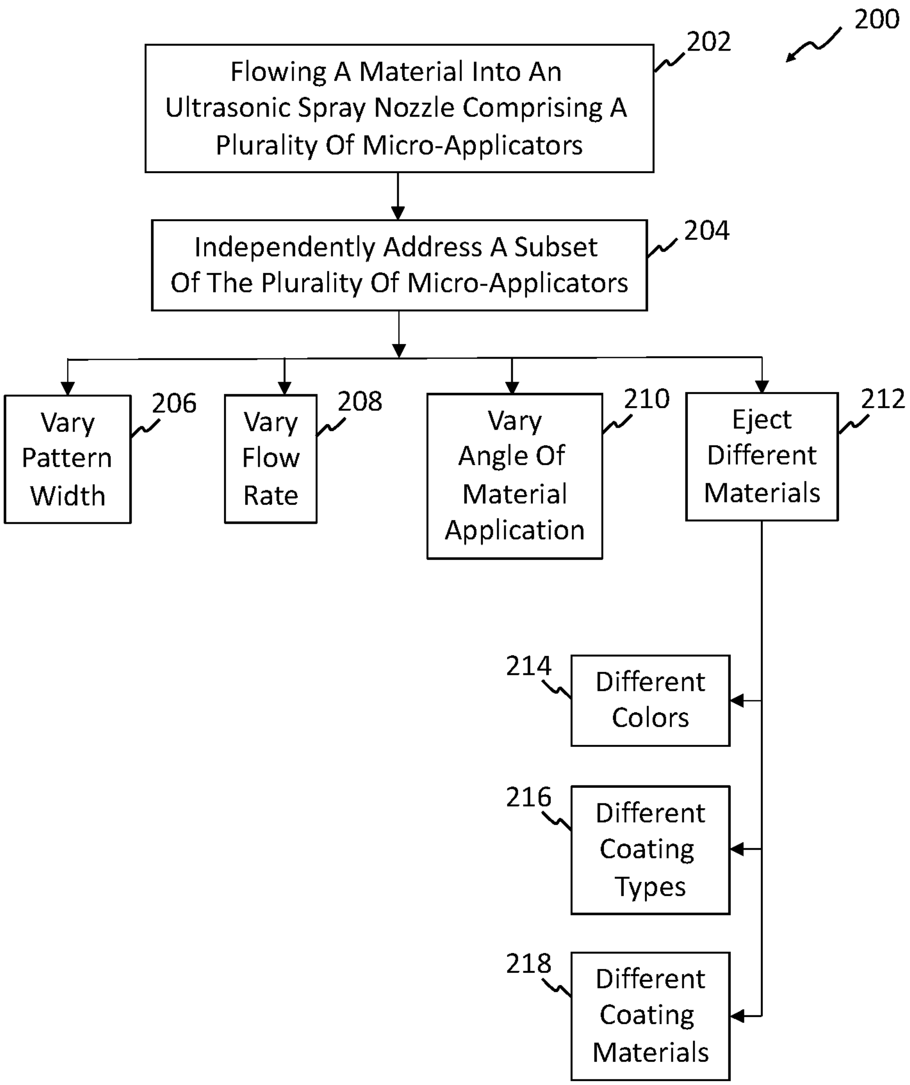
FIG. 4 is a flow diagram illustrating a method of controlling application of at least one material to a substrate according to the teachings of the present disclosure.

Referring now to FIG. 4, a method 200 of controlling application of material(s) to a substrate includes flowing a material into an ultrasonic spray nozzle comprising a plurality of micro-applicators at step 202 and independently addressing a subset of the plurality of micro-applicators at step 204. Independently addressing the subset of micro-applicators may include varying a pattern width of atomized droplets ejected from the plurality of micro-applicators at step 206; varying a flow rate of atomized droplets ejected from the plurality of micro-applicators at step 208; varying an angle that the atomized droplets are applied to a surface at step 210; ejecting different materials (e.g., $M_1$, $M_2$, $M_3$, or $M_n$ shown in FIG. 1) at step 212, and combinations thereof. Non-limiting examples of materials ejected at step 212 include paint materials with different colors/pigments shown at 214, materials for different coating types (e.g., paint, sealant, adhesive, etc.) shown at 216, different materials for a given coating type (e.g., a paint basecoat material and a paint clearcoat material) shown at 218; and combinations thereof.

Figure 5A:
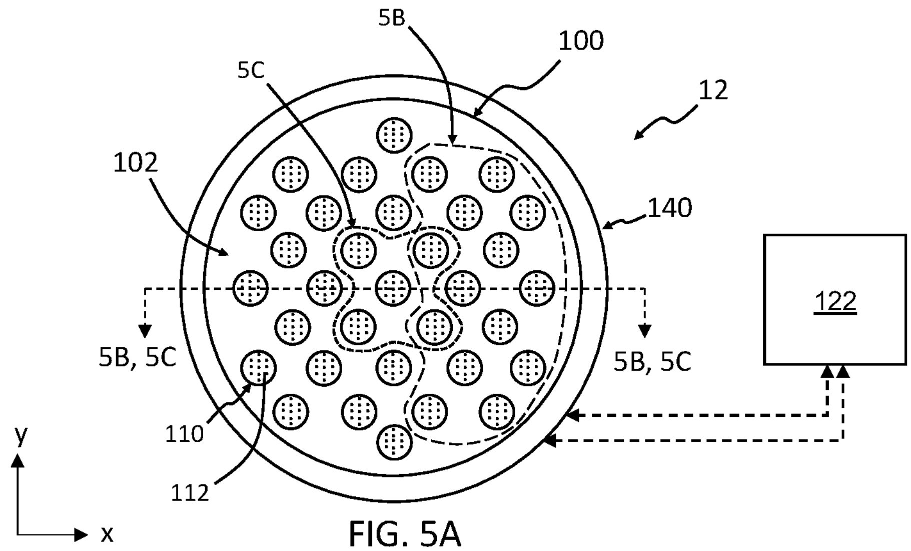
FIG. 5A shows an array of micro-applicators according to yet another form of the present disclosure.
Figure 5B:
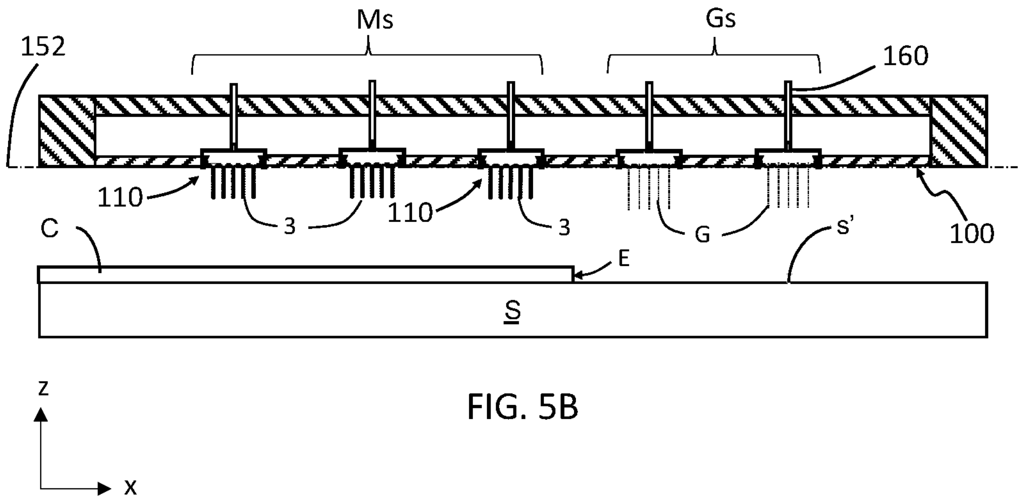
FIG. 5B shows a side cross-sectional view of section 5B-5B in FIG. 5A.
Figure 5C:
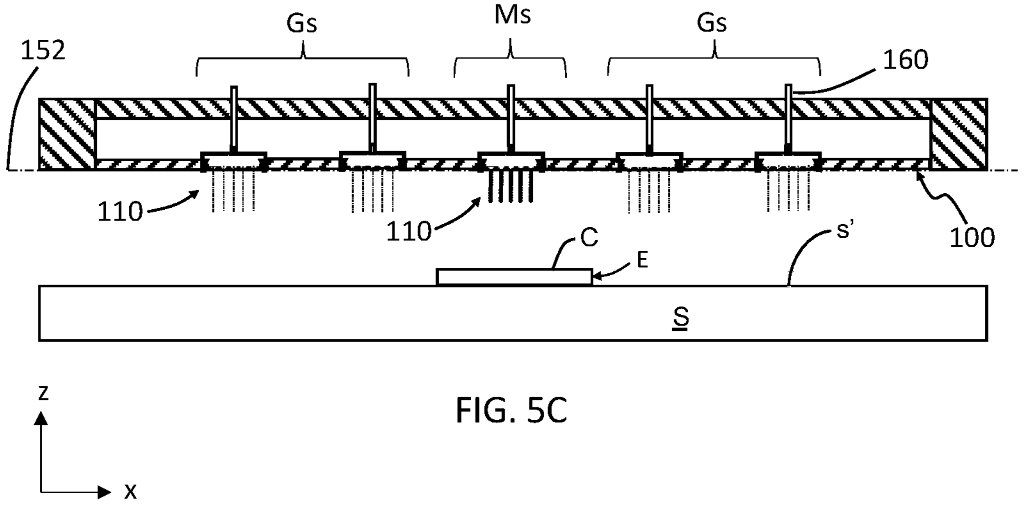
FIG. 5C shows a side cross-sectional view of section 5C-5C in FIG. 5A.

Referring to FIG. to FIGS. 5A through 5C, a material applicator 12 according to another form of the present disclosure is shown. Particularly, and similar to the material applicator 10 described above with like reference numerals referring to like elements, the material applicator 12 includes the array plate 100 with the applicator array 102 comprising a plurality of micro-applicators 110. The array plate 100 with the applicator array 102 is positioned within the housing 140 and each of the micro-applicators 110 comprises the plurality of apertures 112 through which a material M (e.g., a fluid or liquid) can be ejected such that a stream S of atomized droplets 3 of the material are provided as schematically depicted in FIG. 2B. In addition, a subset of the plurality of micro-applicators 110 are configured for at least one gas "G" to flow through and assist the flow of the material M from the array plate 100 to the substrate S. It should be understood that such assistance in the flow of the material M with the flow of the gas G is known as "shaping" the flow of the material M and the gas G is known as "shaping gas." Non-limiting examples of shaping gas G include air, nitrogen, and mixtures thereof, among others.

For example, and with reference to FIGS. 5A and 5B, a subset of micro-applicators labeled '5B' provide shaping gas G on a right side (+x direction) of the array plate 100 such that the coating C on the surface s' of the substrate S is provided with a sharp or clean edge 'E'. That is, the shaping gas G flowing through the subset of micro-applicators 110, labeled 'Gs' in FIG. 5B, "shapes" the material M flowing through the subset of micro-applicators 110 labeled 'Ms' in FIG. 5B such that the flow of material M is controlled (or limited) in the x-direction shown in the figure and clean edge E is formed. As used herein, the term "shape" or "shapes" refers to controlling, directing and/or assisting the flow of the material from a subset of micro-applicators to a substrate such that a desired shape, width, edge, and/or other dimension of a coating C is provided. Also, as used herein the phrase "clean edge" refers to an edge of a coating of material that varies less than 5 millimeters (mm) from a desired line (edge) over a length of the desired line equal to 5 mm. In some variations, the subset of micro-applicators 5B provide shaping gas G on a right side (+x direction) of the array plate 100 such that the coating Con the surface s' of the substrate S is provided with a clean edge E that varies less than 4 mm, for example, less than 3 mm or less than 2 mm, a from a desired line (edge) over a length of the desired line equal to 5 mm.

In another example, and with reference to FIGS. 5A and 5C, a subset of micro-applicators labeled '5C' provide material M such that the material M flows through a central portion of the material applicator 12 and is surrounded or shaped by shaping gas G such that a narrow spray of material is ejected from the material applicator 12, and a narrow (x-direction) coating on the surface s' is provided with a clean edge 'E'. That is, the shaping gas G flowing through the subset of micro-applicators 110 labeled 'Gs' in FIG. 5C "shapes" the material M flowing through the subset of micro-applicators 110 labeled 'Ms' such that the flow of material M is controlled and the width (x-direction) and/or edge E of the coating C is controlled.

In operation, and similar to the material applicator 10, material M flows through the inlet 138 into the reservoirs 136 of the Ms subset of micro-applicators 110. Surface tension of material M results in material M not flowing through the apertures 112 of the micro-applicator plate 114 unless transducer 120 is activated and vibrates as schematically depicted in FIG. 2B. That is, when transducer 120 is activated and vibrates, material M is ejected through and/or from the plurality of apertures 112 as atomized droplets 3. In addition, shaping gas G is provided and flows through the inlet 138 and into the reservoirs 136 of the Gs subset of micro-applicators 110. However, and unlike material M, the shaping gas G flows through the plurality of apertures 112 with or without activation of transducer 120. Accordingly, in some variations of the present disclosure, micro-applicators 110 within a Gs subset of micro-applicators 110 do not have a transducer 120. Also, the flow, flow rate and/or pressure of the shaping gas G is controlled using a gate valve(s), solenoid valve(s), solenoid switch(es), among others. In at least one variation, the shaping gas has a pressure up to 45 pounds per square inch.

In some variations, the controller 122 is included and enabled to individually address the Ms subset of micro-applicators 110 and/or Gs subset of micro-applicators 110. Particularly, each of the micro-applicators 110 has the supply line 160 (FIG. 2C) in fluid communication with its reservoir 136 and the material source 8 or a shaping gas source (not labeled). Also, the controller 122 is configured to communicate with (i.e. address, receive, and send data) the power source 6, material source 8, shaping gas source, and the Ms and Gs subsets of micro-applicators 110 such that the Ms and Gs subsets of micro-applicators 110 are individually addressable (e.g., switched on/off) at any given time. In addition, in at least one variation the controller 122 is configured to communicate with (i.e. address, receive, and send data) the power source 6, material source 8, shaping gas source, and the Ms and Gs subsets of micro-applicators 110 such that each of the micro-applicators 110 in the Ms and/or Gs subsets of micro-applicators 110 is individually addressable. For example, in some variations, at least one of the micro-applicators 110 in the Ms subset of micro-applicators 110 is configured to alternate (i.e., switch), and does alternate, from flowing the material M therethrough to flowing the shaping gas G therethrough. In the alternative, or in addition to, at least one of the micro-applicators 110 in the Gs subset of micro-applicators 110 is configured to alternate, and does alternate, from flowing the material shaping gas G therethrough to flowing the material M therethrough. This versatility decreases the consumption of material, energy, among others, and increase control of the paint spray system 2 over other high volume production environment paint systems.

Figure 6:
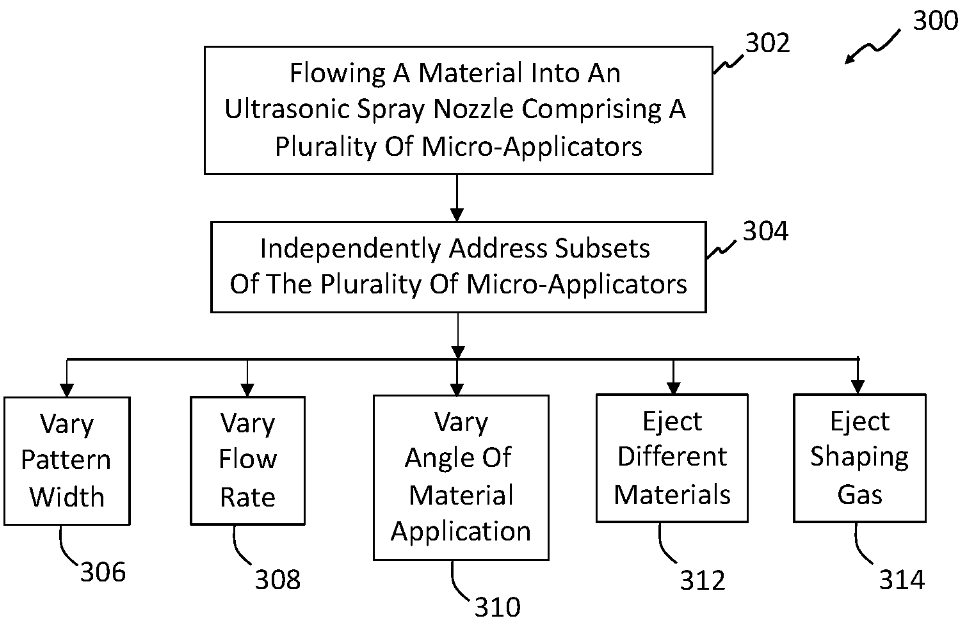
FIG. 6 is a flow diagram illustrating a method of controlling application of at least one material to a substrate with embedded shaping gas according to the teachings of the present disclosure.

Referring now to FIG. 6, a method 300 of controlling application of material(s) to a substrate includes flowing a material and a shaping gas into an ultrasonic spray nozzle comprising a plurality of micro-applicators at step 302 and independently addressing subsets of the plurality of micro-applicators at step 304. Independently addressing the subsets of micro-applicators may include varying a pattern width of atomized droplets ejected from the Ms subset of micro-applicators at step 306; varying a flow rate of atomized droplets ejected from the Ms subset of micro-applicators at step 308; varying an angle that the atomized droplets are applied to a surface at step 310; ejecting different materials (e.g., $M_1$, $M_2$, $M_3$, or $M_n$ shown in FIG. 1) at step 312, ejecting shaping gas through the Gs subset of micro-applicators 110, and combinations thereof.

It should be understood from the teaching of the present disclosure that methods of controlling application of a material to a vehicle is provided. The method includes configuring a subset of an array of micro-applicators to eject a different material than the remainder of the micro-applicators. The different material may be a paint basecoat, paint a clearcoat, a flake containing basecoat, a non-flake containing basecoat, a shaping gas, and the like. As such, the methods may include configuring a first subset of micro-applicators through which a first material is ejected and configuring a second subset of micro-applicators through which a second material (e.g., a shaping gas) is ejected. The first material may be ejected and applied onto a sag prone area of a vehicle followed by ejecting and applying the second material onto the sag prone area of the vehicle. For example, the first material is a one-component (1K) material and the second material is a rheology control agent. The rheology control agent may be an increased viscosity material or a catalyst material. Coupling the rheology control agent with the 1K material forms a two-component (2K) material that improves overall appearance and sag control of the 2K material on the sag prone area of the vehicle.

As described above the controller is enabled to individually address at least a subset of the micro-applicators. Thus, a plurality of micro-applicators through manual or automated control are configured and enabled to control (on/off/intensity): flow rate of material, material to be applied, number of materials, pattern width, other coating/painting variables, and combinations thereof. It should be understood that controlling material flow rate ejected from the plurality of micro-applicators controls droplet density and controlling density based as a function of part geometry enables uniform coverage and improves efficiency.

As described above, the present disclosure enables individually addressable micro-applicators and individually addressable arrays or subsets of arrays of micro-applicators. In some aspects of the present disclosure the individually addressable micro-applicators enable ejecting two or more different narrowly distributed atomized droplet sizes. For example, each micro-applicator and/or each subset of micro-applicators of a material applicator can eject a different material with its required or optimal atomized droplet size. In one non-limiting example, a first subset of micro-applicators of a material applicator applies (e.g., sprays) a basecoat material without metallic flake to a first area of a substrate and a second subset of micro-applicators of the material applicator applies a basecoat material with metallic flake to a second area of the substrate. Also, the first subset of micro-applicators ejects the basecoat material without metallic flake as atomized droplets with a first narrowly distributed droplet size and the second subset of micro-applicators ejects the basecoat material with metallic flake as atomized droplets with a second narrowly distributed droplet size that is different than the first average droplet size. As used herein, the phrase "narrowly distributed droplet size" refers to a droplet size distribution where greater than 90% of atomized droplets ejected from a micro-applicator have a droplet diameter within +/−10% of a mean droplet size of the atomized droplets ejected from the micro-applicator. In some aspects of the present disclosure, the droplet size distribution comprises greater than 95% of atomized droplets ejected from a micro-applicator having a droplet diameter within +/−5% of a mean droplet size.

In another non-limiting example, a first subset of micro-applicators of a material applicator applies a first color material to a first area of a substrate and a second subset of micro-applicators of the material applicator applies a second color material to a second area of the substrate. Also, the first subset of micro-applicators ejects the first color material as atomized droplets with a first average droplet size and the second subset of micro-applicators ejects the second color material as atomized droplets with a second average droplet size that is different than the first average droplet size. In still another non-limiting example, a first subset of micro-applicators of a material applicator applies a first layer material to a substrate and a second subset of micro-applicators of the material applicator applies a second layer material over the first layer material on the substrate. Also, the first subset of micro-applicators ejects the first layer material as atomized droplets with a first average droplet size and the second subset of micro-applicators ejects the second layer material as atomized droplets with a second average droplet size that is different than the first average droplet size.

In still yet another non-limiting example, a first subset of micro-applicators of a material applicator applies a paint material to a first area of a substrate and a second subset of micro-applicators of the material applicator applies a shaping gas to control or shape the flow of the paint material from the first subset of micro-applicators to the substrate.

It should also be understood that a paint booth using the composite ultrasonic applicators disclosed herein may provide improved efficiency and reduced cost. For example, such a paint booth may have:

airflow reduced from ~100 ft/min. down to 60 ft/min.;

a side-draft booth in automated zones thereby providing a smaller footprint for the paint booth;

reductions in dry-booth material consumption and a reduction or elimination of wet-booth sludge system;

recirculation of air limited only by LEL (lower explosive level) of solvent;

reduction of high pressure water blasting/cleaning of booth grates;

reduced air consumption and associated reduction in energy used to heat, humidify, and condition booth air;

reduced air consumption allowing reductions in abatement equipment size; and reduction in sludge waste removal and landfill cost.

As used herein, the phrase at least one of A, B, and C should be construed to mean a logical (A OR B OR C), using a non-exclusive logical OR, and should not be construed to mean "at least one of A, at least one of B, and at least one of C."

When an element or layer is referred to as being "on," or "coupled to," another element or layer, it may be directly on, engaged, connected or coupled to the other element or layer, or intervening elements or layers may be present. In contrast, when an element is referred to as being Other words used to describe the relationship between elements should be interpreted in like fashion (e.g., "between" versus "directly between," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Specially relative terms, such as "outer," "below," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A material applicator for controlling application of at least one material to a substrate, the material applicator comprising:

an array plate comprising a plurality of micro-applicators, each micro-applicator including:

a micro-applicator plate defining a plurality of apertures extending through the micro-applicator plate;

a frame cooperating with the micro-applicator plate to define a reservoir;

a material inlet in fluid communication with the reservoir; and an actuator configured to vibrate to eject a liquid from the reservoir through the plurality of apertures, wherein the plurality of micro-applicators includes a first subset of the micro-applicators and a second subset of the micro-applicators, wherein the material applicator is configured to be operated in a first mode wherein the material inlets of the micro-applicators of the first subset are connected to a first material source and the material inlets of the micro-applicators of the second subset are connected to a second material source, wherein in the first mode, the first material source is configured to supply liquid to the material inlets of the first subset of micro-applicators and the second material source is configured to supply pressurized gas to the material inlets of the second subset of micro-applicators.

2. The material applicator according to claim 1 further comprising a controller configured selectively operate the actuators of the micro-applicators, wherein, when operating in the first mode, the controller operates the actuators of the first subset to eject liquid from the first subset while simultaneously spraying pressurized gas through the plurality of apertures of the second subset.

3. The material applicator according to claim 2, wherein the controller is configured to switch the material applicator from the first mode to a second mode in which at least one micro-applicator of the first subset sprays pressurized gas while liquid is simultaneously sprayed from at least one other micro-applicator of the first subset.

4. The material applicator according to claim 3, wherein the liquid sprayed from the at least one other micro-applicator of the first subset in the second mode is a different liquid than the liquid ejected from the first subset in the first mode.

5. The material applicator according to claim 2, wherein the controller is configured to switch the material applicator from the first mode to a second mode in which at least one micro-applicator of the first subset sprays pressurized gas while liquid is simultaneously sprayed from at least one micro-applicator of the second subset.

6. The material applicator according to claim 5, wherein the liquid sprayed from the at least one other micro-applicator of the second subset in the second mode is a different liquid than the liquid ejected from the first subset in the first mode.

7. The material applicator according to claim 2, wherein the controller is configured to switch the material applicator from the first mode to a second mode in which at least one micro-applicator of the first subset sprays pressurized gas while liquid is simultaneously sprayed from at least one other micro-applicator of the first subset and the at least one micro-applicator of the second subset.

8. The material applicator according to claim 2, wherein the controller is configured to switch the material applicator from the first mode to a second mode in which at least one micro-applicator of the second subset sprays liquid.

9. The material applicator according to claim 8, wherein the liquid sprayed from the at least one other micro-applicator of the second subset in the second mode is a different liquid than the liquid ejected from the first subset in the first mode.

10. The material applicator according to claim 2, wherein the actuators corresponding to micro-applicators spraying pressurized gas are not activated while the pressurized gas is sprayed therefrom.

11. The material applicator according to claim 1, wherein each actuator is configured to vibrate a corresponding one of the micro-applicator plates.

12. The material applicator according to claim 1 further comprising a controller in electrical communication with each actuator, wherein each micro-applicator is individually addressable to be controlled separately by the controller.

13. The material applicator according to claim 1, wherein each actuator is an ultrasonic transducer.

14. The material applicator according to claim 1, wherein the array plate includes a plurality of planes and one or more micro-applicators of the plurality of micro-applicators is located on a first plane of the plurality of planes and one or more different micro-applicator of the plurality of micro-applicators is located on a second plane of the plurality of planes.

15. The material applicator according to claim 14, wherein the first plane is parallel to but offset from the second plane.

16. The material applicator according to claim 14, wherein the first plane is not parallel to the second plane.

17. The material applicator according to claim 1, wherein the array plate is concave or convex.

18. A material applicator for controlling application of at least one material on a substrate comprising:

an array of micro-applicators comprising a first subset of micro-applicators and a second subset of micro-applicators different than the first subset of micro-applicators, wherein each of the micro-applicators in the array of micro-applicators comprises a micro-applicator plate, a plurality of apertures extending through the micro-applicator plate, a reservoir in fluid communication with the plurality of apertures;

a plurality of first transducers, each first transducer being in mechanical communication with a corresponding one of the micro-applicator plates in the first subset of micro-applicators; and a plurality of second transducers, each second transducer being in mechanical communication with a corresponding one of the micro-applicator plates in the second subset of micro-applicators, wherein a liquid supply is in fluid communication with the plurality of apertures of each of the micro-applicators in the first subset of micro-applicators and a pressurized gas supply is in fluid communication with the plurality of apertures of each of the micro-applicators in the second subset of micro-applicators.

19. The material applicator according to claim 18, wherein the first subset of micro-applicators and the second subset of micro-applicators are individually addressable.

* * * * *